(12) United States Patent
Miyatake et al.

(10) Patent No.: US 8,654,172 B2
(45) Date of Patent: Feb. 18, 2014

(54) OPTICAL SCANNING DEVICE AND IMAGE FORMING APPARATUS

(75) Inventors: Naoki Miyatake, Kanagawa (JP); Tadashi Nakamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 12/940,311

(22) Filed: Nov. 5, 2010

(65) Prior Publication Data
US 2011/0110687 A1 May 12, 2011

(30) Foreign Application Priority Data
Nov. 6, 2009 (JP) ................................. 2009-254940

(51) Int. Cl.
*B41J 27/00* (2006.01)
*B41J 2/435* (2006.01)
*B41J 15/14* (2006.01)

(52) U.S. Cl.
USPC ........... 347/260; 347/258; 347/259; 347/261; 347/224; 347/243

(58) Field of Classification Search
USPC ................. 347/243, 224, 256, 258–261, 244; 437/256, 258–260
See application file for complete search history.

(56) References Cited

U.S. PATENT DOCUMENTS

| | | | |
|---|---|---|---|
| 5,680,254 A | 10/1997 | Ueda et al. | |
| 6,621,512 B2 | 9/2003 | Nakajima et al. | |
| 6,771,300 B2 | 8/2004 | Amada et al. | |
| 6,771,406 B2 | 8/2004 | Iizuka et al. | |
| 6,813,051 B2 | 11/2004 | Suzuki et al. | |
| 6,934,061 B2 * | 8/2005 | Ono et al. | 359/204.4 |
| 6,937,374 B2 | 8/2005 | Iizuka et al. | |
| 6,987,593 B2 | 1/2006 | Hayashi et al. | |
| 7,050,082 B2 | 5/2006 | Suzuki et al. | |
| 7,050,210 B2 | 5/2006 | Atsuumi et al. | |
| 7,088,484 B2 | 8/2006 | Hayashi et al. | |
| 7,161,724 B1 | 1/2007 | Miyatake | |
| 7,167,288 B2 | 1/2007 | Miyatake et al. | |
| 7,277,212 B2 | 10/2007 | Miyatake et al. | |
| 7,385,181 B2 * | 6/2008 | Miyatake et al. | 250/234 |
| 7,411,712 B2 | 8/2008 | Nakajima et al. | |

(Continued)

FOREIGN PATENT DOCUMENTS

| | | |
|---|---|---|
| JP | 2003-5114 A | 1/2003 |
| JP | 2006-72288 A | 3/2006 |
| JP | 2006-259427 A | 9/2006 |
| JP | 2008-32961 A | 2/2008 |

*Primary Examiner* — Stephen D Meier
*Assistant Examiner* — Sarah Al Hashimi
(74) *Attorney, Agent, or Firm* — Dickstein Shapiro LLP

(57) ABSTRACT

A plurality of light sources, a light deflector, and a single scan lens. The light deflector deflects a plurality of light beams emitted from the light sources by a same face for scanning a plurality of to-be-scanned portions simultaneously. The single scan lens receives the light beams from the light deflector and focuses the light beams onto each of the plurality of to-be-scanned portions to scan the to-be-scanned portions simultaneously. The single scan lens is used in common for the light beams, and has one incidence plane and a plurality of exit planes in a sub-scanning direction separately prepared in the sub-scanning direction for each of the to-be-scanned portions. The incidence plane has a refractive power of the lens in the sub-scanning direction decreasing toward peripheral portions in the main scanning direction. The exit planes have positive refractive power in the main and sub-scanning directions.

16 Claims, 3 Drawing Sheets

(56) References Cited

U.S. PATENT DOCUMENTS

| | | |
|---|---|---|
| 7,471,434 B2 | 12/2008 | Nakamura et al. |
| 7,538,925 B2 | 5/2009 | Miyatake |
| 7,551,337 B2 | 6/2009 | Hirakawa et al. |
| 7,633,663 B2 | 12/2009 | Hirakawa et al. |
| 7,643,193 B2 | 1/2010 | Nakamura et al. |
| 7,728,863 B2 | 6/2010 | Miyatake et al. |
| 7,729,031 B2 | 6/2010 | Nakamura et al. |
| 7,764,301 B2 | 7/2010 | Suzuki et al. |
| 2006/0187294 A1* | 8/2006 | Saisho et al. ............ 347/224 |
| 2007/0216754 A1 | 9/2007 | Miyatake |
| 2008/0068691 A1 | 3/2008 | Miyatake |
| 2008/0180772 A1 | 7/2008 | Miyatake et al. |
| 2008/0192319 A1 | 8/2008 | Miyatake et al. |
| 2008/0192323 A1 | 8/2008 | Nakamura et al. |
| 2008/0218829 A1 | 9/2008 | Nakamura |
| 2009/0015897 A1 | 1/2009 | Nakamura et al. |
| 2009/0073523 A1 | 3/2009 | Nakamura |
| 2009/0073528 A1 | 3/2009 | Miyatake |
| 2009/0168132 A1 | 7/2009 | Miyatake |
| 2009/0201358 A1 | 8/2009 | Nakamura |
| 2010/0091083 A1 | 4/2010 | Itami et al. |
| 2010/0091342 A1 | 4/2010 | Nakamura |

* cited by examiner

OPTICAL SCANNING DEVICE AND IMAGE FORMING APPARATUS

CROSS-REFERENCE TO RELATED APPLICATIONS

This application claims priority to Japanese Patent Application No. 2009-254940, filed on Nov. 6, 2009 in the Japan Patent Office, which is hereby incorporated by reference herein in its entirety.

BACKGROUND OF THE INVENTION

1. Field of the Invention

The present invention relates to an optical scanning device and an image forming apparatus using an optical scanning device.

2. Description of the Background Art

Optical scanning devices employed in laser printers or the like emit an optical scanning beam from a light source that is deflected by a light deflector and then focused on a target surface using a scan/focus optical system having a f-theta lens or the like, to form a light beam spot on the target surface. The light beam spot is used to optically scan the target surface in a main scanning direction. The target surface may be a photoconductive face of a photoconductive object such as a photoconductor.

Tandem type image forming apparatuses having combinations of two or more such optical scanning devices and photoconductive objects are used to form color images (two-color images, multi-color images, etc.). As one configuration, an optical scanning unit to optically scan a plurality of photoconductive objects uses a single light deflector (such as rotatable multi-faceted mirror) to scan a plurality of photoconductive objects. Use of a single light deflector for a plurality of to-be-scanned faces enables the number of the light deflectors to be reduced, thereby enabling the image forming apparatuses to be made more compact.

In such a configuration, a plurality of optical scanning beams strikes one face of a rotatable multi-faceted mirror. However, making these multiple optical scanning beams parallel to each other in a sub-scanning direction, perpendicular to the main scanning direction, requires an increase in the size of the rotatable multi-faceted mirror along its rotational axis, which in turn increases manufacturing costs and hinders efforts to make image forming apparatuses more compact.

In view of such situation, JP-2003-5114-A discusses a system in which two or more optical scanning beams strike the same face of a rotatable multi-faceted mirror but at different angles of incidence in the sub-scanning direction (hereinafter "oblique system"). The advantage of such a system is that a plurality of optical scanning beams can be deflected simultaneously in the sub-scanning direction with even a narrow mirror face, and each optical path for each scanning beam, used to guide the deflected each scanning beam to a corresponding to-be-scanned face, can be easily separated from every other.

In such oblique system, because each optical scanning beam is deflected by a rotatable multi-faceted mirror in such a manner that a conical surface is swept around the rotation axis of the rotatable multi-faceted mirror, a so-called "skew of light flux" may occur at each deflected optical scanning beam when entering a scan lens, in which wavefront aberration of the optical scanning beam increases, focusing performance at a to-be-scanned face is degraded, the diameter of the light beam spot increases at peripheral portions in the main scanning direction, and resolution of the image deteriorates.

Further, the above-described deflection configuration may be more likely to cause a so-called "curving of scanning line." The level of curving of the scanning line varies depending on the angle of incidence (which is not zero degrees) of the optical scanning beam in the sub-scanning direction. When an electrostatic latent image written by each optical scanning beam is developed as a toner color image and each toner color is superimposed on top of the preceding color, such curving of the scanning line may cause "misalignment of color images."

The inventor of the present invention has discussed an optical scanning device for oblique system in JP-2006-72288-A, which may be effective for solving the above-mentioned drawbacks of wavefront aberration/curving of scanning line. Thus, in the such optical scanning device of JP-2006-72288-A, a scan/focus optical system having two lenses is employed, in which one lens at a rotatable multi-faceted mirror side is used in common for a plurality of optical scanning beams and another lens is disposed at a to-be-scanned face side for each of optical scanning beams. However, because such other lenses are typically long, such a configuration may impose undesirable design limitations on the practical layout of an optical path extending from a light deflector to each to-be-scanned faces.

SUMMARY

In one aspect of the invention, an optical scanning device is devised. The optical scanning device includes a plurality of light sources, a light deflector, and a single scan lens. The plurality of light sources emit light used as a plurality of optical scanning beams. The light deflector having one or more faces and rotates about a light deflector axis parallel to the one or more faces. The plurality of optical scanning beams emitted from the plurality of light sources are reflectable at the one or more faces of the light deflector. The light deflector deflects the plurality of optical scanning beams by a same face to optically scan a plurality of to-be-scanned portions simultaneously. The single scan lens receives the plurality of optical scanning beams from the light deflector and directs the plurality of optical scanning beams onto the plurality of to-be-scanned portions, and focuses the plurality of optical scanning beams on the plurality of to-be-scanned portions to optically scan the plurality of to-be-scanned portions simultaneously. The plurality of optical scanning beams that optically scan the plurality of to-be-scanned portions simultaneously strike the same face of the light deflector at different angles of incidence in a sub-scanning direction. The single scan lens is used in common for the plurality of optical scan beams deflected by the same face of the light deflector. The single scan lens has one single incidence plane at the face side of light deflector and a plurality of exit planes at the to-be-scanned portions side. Each exit plane is separately prepared in a sub-scanning direction for each of the to-be-scanned portions. The incidence plane of the single scan lens formed as a special face in which a refractive power of the lens in a sub-scanning direction decreases toward peripheral portions in a main scanning direction, and the exit planes of the single scan lens are formed as a face having positive refractive power both in the main scanning direction and sub-scanning direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1A:
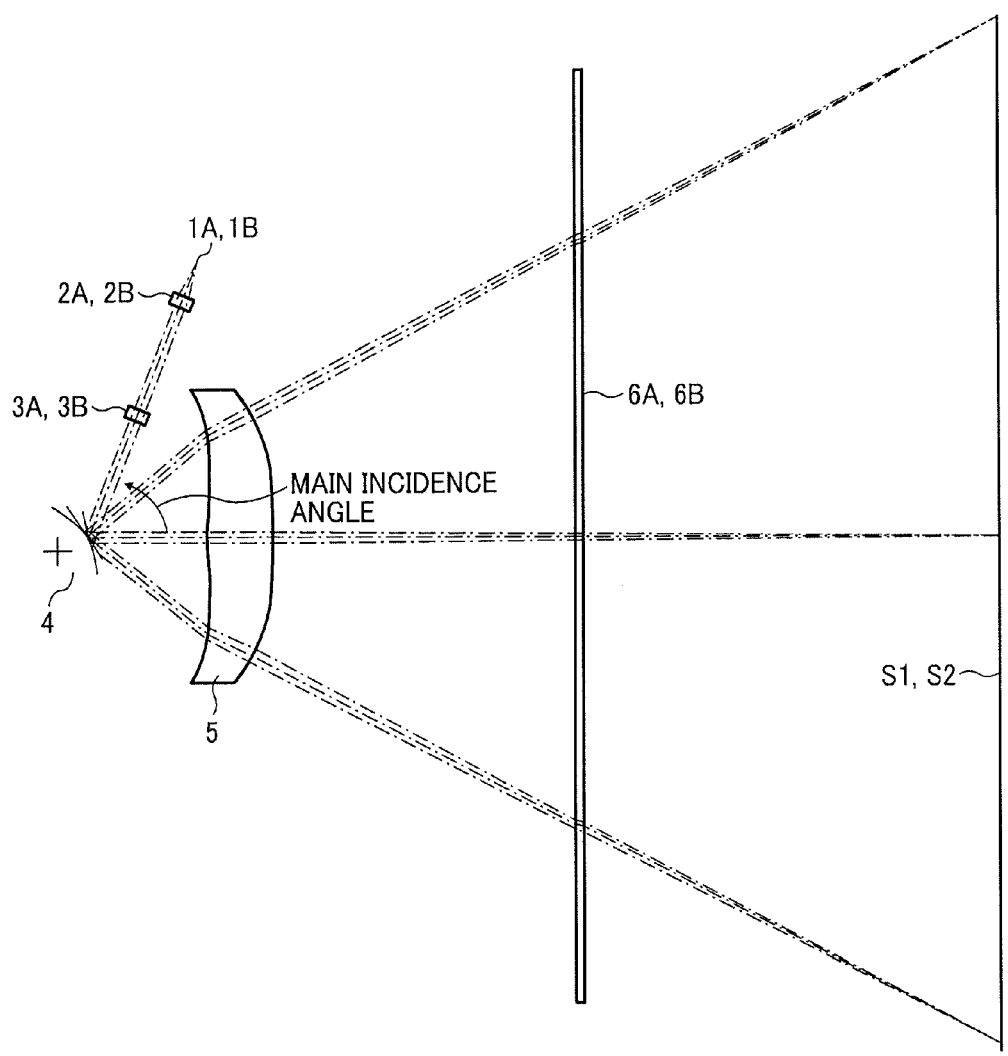
FIGS. 1A and 1B show an arrangement of optical scanning device according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner. Referring now to the drawings, an optical scanning device according to example embodiment is described hereinafter.

The optical scanning device according to an example embodiment may use a light deflector having deflective reflection faces, in which a deflective reflection face may be set parallel to a rotation axis of the light deflector and rotated around the rotation axis to deflect optical scanning beams. Hereinafter, the deflective reflection face may mean one or more deflective reflection faces, and the deflective reflection face may be referred to as face, as required. A plurality of optical scanning beams can be simultaneously deflected by the same face of the light deflector to optically scan a plurality of to-be-scanned portions, and each deflected optical scanning beam can be focused onto each corresponding to-be-scanned portion using a scan lens. As such, the optical scanning device can be used to optically scan a plurality of to-be-scanned portions simultaneously.

The light deflector rotates to rotate deflective reflection face, wherein the rotation axis of the light deflector is parallel to a face of the light deflector. Typically, such light deflector may be a rotatable multi-faceted mirror (hereinafter, may be referred to as a polygon mirror), and a rotatable two-faceted mirror that rotates two faces, a rotatable one-faceted mirror that rotates one single face, or the like can be used.

The light deflector can simultaneously deflect a plurality of optical scanning beams at the same face. Such deflected plurality of optical scanning beams can be used to optically scan a plurality of to-be-scanned portions simultaneously.

Each optical scanning beam optically scans each corresponding to-be-scanned portion. Each of the optical scanning beams may be a single light beam, or such single light beam may be grouped as a plurality of light beams, by which multi-beam optical scanning for to-be-scanned portions can be conducted.

Such to-be-scanned portion may be a surface of photoconductive object having photoconductivity, and a plurality of to-be-scanned portions may be different photoconductive faces of different photoconductive objects. Further, such to-be-scanned portions may be a plurality of to-be-scanned portions set on different positions on the same photoconductive face.

FIG. 1 shows an optical scanning device according to an example embodiment. As shown in FIG. 1A, an optical scanning device may include light sources 1A and 1B, which may be for example semiconductor lasers, coupling lenses 2A and 2B, cylindrical lenses 3A and 3B, a polygon mirror 4, and a scan lens 5, or the like, for example. The light sources 1A and 1B may be disposed in a stacked manner each other. The coupling lenses 2A and 2B may be also disposed in a stacked manner each other. The cylindrical lenses 3A and 3B may be also disposed in a stacked manner each other in a sub-scanning direction (i.e., a direction perpendicular to a sheet face of FIG. 1).

Divergent light flux (or optical scanning beam) radiated from the light source 1A is converted to a given light flux by the coupling lens 2A suitable for optical parts or elements disposed after the coupling lens 2A. Light flux from the coupling lens 2A is focused in the sub-scanning direction by the cylindrical lens 3A, and then enters a face of polygon mirror 4, wherein the polygon mirror 4 is used as a light deflector. As such, the face of polygon mirror 4 is used as a deflective reflection face to deflect light beams coming from the cylindrical lens 3A.

Similarly, divergent light flux (or optical scanning beam) radiated from the light source 1B is converted to a light flux by the coupling lens 2B suitable for optical elements disposed after the coupling lens 2B. Light flux from the coupling lens 2B is focused in the sub-scanning direction by the cylindrical lens 3B, and then enters a face of polygon mirror 4.

Light flux converted by the coupling lenses 2A and 2B may be parallel light flux, weak divergent light flux, or weak focusing light flux.

Further, "beam shaping" may be conducted for such optical scanning beams (or light beams) at a given position in an optical path between the coupling lenses 2A/2B and a face of polygon mirror 4 using an opening section of an aperture member, which is not shown.

As above described, optical scanning beams emitted from the light sources 1A and 1B may enter the same face of polygon mirror 4, and then are focused near the face as a line image extending in a main scanning direction. Optical scanning beams may enter a face of polygon mirror 4 with oblique angles with respect to in the sub-scanning direction, wherein such beam entering may be referred to as "oblique-entering system" or "oblique system."

An angle of incidence of oblique-entering of optical scanning beam with respect to a face of polygon mirror 4 (hereinafter, referred to oblique-entering angle) may be set by inclining an optical path defined by the light sources 1A and 1B, the coupling lenses 2A and 2B, and the cylindrical lenses 3A and 3B, or by inclining an optical path from the light sources 1A and 1B to the polygon mirror 4 by inflecting light beams using an inflection mirror, for example.

Further, the optic axis of the cylindrical lenses 3A and 3B may be shifted in the sub-scanning direction to set a given oblique-entering angle for light beams going to a face of polygon mirror 4.

Figure 1B:
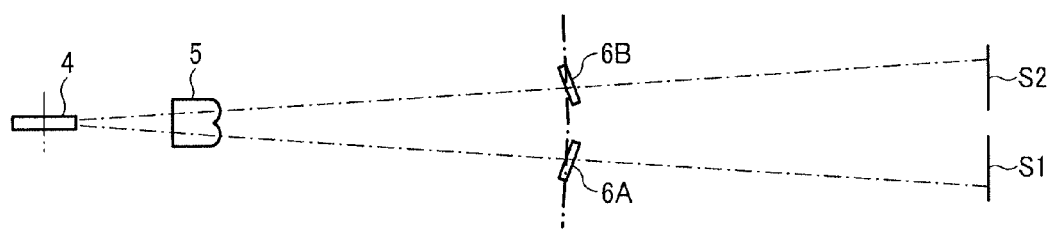

FIG. 1B shows example conditions of two optical scanning beams, which enter and reflect from a face of polygon mirror 4, wherein the sub-scanning direction is set in upper to lower direction in FIG. 1B.

As shown in FIG. 1B, the reflected optical scanning beams enter the scan lens 5 while a distance between the two optical scanning beams becoming greater in the sub-scanning direction as the optical scanning beams approach to the scan lens 5 closer.

The reflected two optical scanning beams deflect with an equiangular speed at a face of the polygon mirror 4 as the polygon mirror 4 rotates at a uniform speed, and each optical scanning beam is focused on surfaces S1 and S2 with an effect of the scan lens 5, wherein the surfaces S1 and S2 may be also referred to as "to-be-scanned portion" or "to-be-scanned face." With such a configuration, each of two optical scanning beams form a beam spot onto the surfaces S1 and S2, respectively, to optically scan each of the surfaces S1 and S2.

Further, an optical element 6A may be disposed at a given position in an optical path of optical scanning beam that optically scans the surface S1, and an optical element 6B may be disposed at a given position in optical path of optical scanning beam that optically scans the surface S2.

Figure 2:
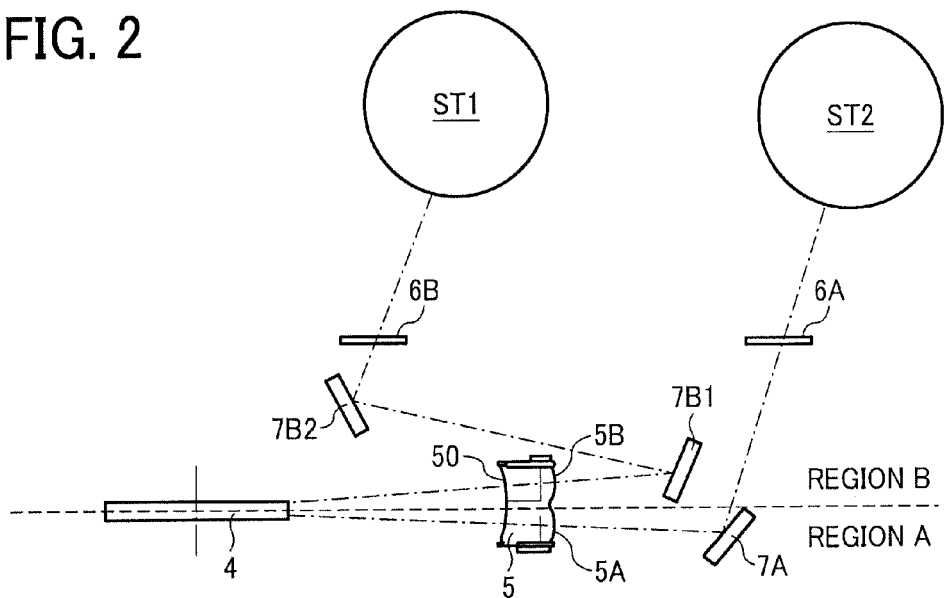
FIG. 2 shows example optical path set for optical scanning beams from a polygon mirror to to-be-scanned faces of FIG. 1 viewed from a main scanning direction.

FIG. 2 shows an example optical path of optical scanning beam extending from the polygon mirror 4 to each of the surfaces, which is viewed from a main scanning direction.

In FIG. 2, a virtual plane, which is perpendicular to the rotation axis of polygon mirror 4 and dividing a face in half in the sub-scanning direction, is expressed by a dotted line extending in a horizontal direction, and a region lower than the virtual plane is referred to as region A, and a region upper than the virtual plane is referred to as region B.

The optical scanning beam, reflected in the region A by a face of polygon mirror 4 is an optical scanning beam radiated from the light source 1A shown in FIG. 1A. After passing through the scan lens 5, the optical scanning beam is reflected by the optical-path inflection mirror 7A, and passes through the optical element 6A, and then optically scans a photoconductor drum ST2 having photoconductivity, which is an actual object of the surface S1.

The optical scanning beam, reflected in the region B by a face of polygon mirror 4 is an optical scanning beam radiated from the light source 1B shown in FIG. 1A. After passing through the scan lens 5, the optical scanning beam is reflected by the optical-path inflection mirrors 7B1 and 7B2 sequentially, passes through the optical element 6B, and then optically scans a photoconductor drum ST1, which is an actual object of the surface S2.

As such, optical paths of two optical scanning beams may be mutually separated by the optical-path inflection mirrors 7A, 7B1, 7B2, and the two optical scanning beams are guided to each photoconductor drum having a surface, which is to be scanned.

In an example embodiment, the number of optical-path inflection mirror, disposed in the optical path of optical scanning beam reflected to the region A by a face of polygon mirror 4, is set to an odd number such as for example one inflection mirror (see 7A), while the number of optical-path inflection mirror, disposed in the optical path of optical scanning beam reflected to the region B by a face of polygon mirror 4, is set to an even number such as for example two inflection mirrors (see 7B1 and 7B2). With such optical arrangement, a direction of curving of scanning line occurring in an oblique-entering system can be matched, by which misalignment of colors of superimposed images for forming a color image can be reduced.

As shown in FIG. 2, optical scanning beams emitted from a plurality of light sources are reflected at a face of polygon mirror 4, used a deflector. Each optical scanning beam has some angle with respect to a normal line of a face of the polygon mirror 4, which means each optical scanning beam has some angle with respect to a face of the polygon mirror 4 in the sub-scanning direction. With such a configuration setting a given angle in the sub-scanning direction for optical scanning beam, a narrower width can be set for a face of the polygon mirror 4. Because the polygon mirror 4 has a relatively higher manufacturing cost among parts composing the optical scanning device, or has a relatively greater share of a manufacturing cost of optical scanning device, by setting a narrower width for a face of polygon mirror 4 in the sub-scanning direction, material cost and manufacturing cost can be reduced, by which an more environmental-friendly optical scanning device can be devised such as for example power consumption and noise generation of optical scanning device can be reduced.

A description is now given to the scan lens 5. As shown in FIG. 2, the scan lens 5 is a single scan lens, which is used in common for a plurality of optical scanning beams, which can be deflected simultaneously at the same face of the polygon mirror 4. The scan lens 5 may be a single lens having one incidence plane 50 and two exit planes 5A and 5B, for example. In an example embodiment, the incidence plane 50 has no curvature in the sub-scanning direction at the center in the main scanning direction, and the curvature of incidence plane 50 changes as closer to peripheral portion in the main scanning direction (i.e., a direction perpendicular to a sheet face of FIG. 2).

The curvature of the incidence plane 50 in a sub-scanning direction may have a "negative refractive power" except at the center portion in a main scanning direction. The incidence plane 50 may be used to correct wavefront aberration, to be described later.

The exit planes 5A and 5B may be separately formed at the exit side of the scan lens 5, and each optical scanning beam exiting from each exit plane goes to each of surfaces S1 and S2. Such exit planes 5A and 5B may have positive refractive power to focus optical scanning beams as a light beam spot onto the corresponding to-be-scanned face. Each of exit planes 5A and 5B, separately formed in the sub-scanning direction, may have the same shape, and curvature of exit planes 5A/5B in a sub-scanning direction may change along the main scanning direction, starting from the center toward the peripheral portions in the main scanning direction. Further, a cross-sectional view of FIG. 2 is taken at a position deviated from the center of the main scanning direction of scan lens 5, by which a cross-sectional shape of the incidence plane 50 in FIG. 2 becomes a crater contour but not a straight shape.

A description is now given to correction of wavefront aberration. Unless a shape of incidence plane of scan lens in the main scanning direction is formed as an arc shape, which can be formed using a reflection point of optical scanning beam at a face of polygon mirror as a center, a distance from a face of polygon mirror to an incidence plane of scan lens becomes different depending on image height.

Usually, if a shape of incidence plane of scan lens in the main scanning direction is formed in an arc shape, which is formed using a reflection point of optical scanning beam at a face of polygon mirror as a center, it may become hard to devise required optical performance. Usually, an optical scanning beam deflected by a light deflector may not enter an incidence plane of scan lens 5 with a perpendicular angle as shown in FIG. 1, which shows a cross-sectional face in the main scanning direction (i.e., parallel to a sheet face of FIG. 1), but enters the incidence plane of the scan lens 5 with some angle of incidence in the main scanning direction.

Optical scanning beam deflected by the polygon mirror 4 is a light flux having some width in a main scanning direction, and as for light beams of light flux at the both end portions in a main scanning direction in light flux, a distance from a face of the polygon mirror 4 to the incidence plane of scan lens 5 may become different compared to other light beams. Because the light flux enters a face of polygon mirror 4 with oblique-entering angle, light beams at the both end portions in a main scanning direction have some angle in the sub-scanning direction. Positions that such light beams enter the incidence plane of scan lens 5 becomes different in the sub-scanning direction, by which optical scanning beams enter the incidence plane of scan lens 5 with "skewed condition." Such "skew of light flux" occurs greatly when light beams enter a face of scan lens having a stronger refractive power in the sub-scanning direction (i.e., when an absolute value of numerical value of refractive power is great).

In the oblique system, each optical scanning beam reflected at a face of polygon mirror enters the incidence plane of scan lens with different height in the sub-scanning direction. However, as for a center image height corresponding to the center portion in the main scanning direction, optical scanning beam enters the incidence plane of scan lens with a "substantially perpendicular direction" when viewed from the sub-scanning direction, and thereby each light beam in light flux (for example, a light beam passing a center in the sub-scanning direction at opening section of a beam-shaping aperture member and two light beams at both end in the main scanning direction) may enter a scan lens without differentiating height in the sub-scanning direction. Accordingly, as for optical scanning beams used going for a center image height, the above described skew of light flux may not occur, and wavefront may not deteriorate, by which a beam spot diameter of light beam can be maintained at a preferable level.

However, as for peripheral portion image height, each light beam in light flux (used as optical scanning beam) at corresponding peripheral portions in the main scanning direction may have different incidence height in the sub-scanning direction due to difference of length of optical path from the polygon mirror to the incidence plane of scan lens, by which light flux become a skewed condition, and wavefront aberration may deteriorate, and each light beam may not be focused onto one point on a to-be-scanned face correctly, but a beam spot diameter of light beam increases, which may be referred to as "diffusion of spot diameter."

As shown in FIG. 1A, an angle of incidence of optical scanning beam at the scan lens 5 becomes greater as closer to a peripheral portion image height in the main scanning direction, and because a deviation of incidence position of optical scanning beams at the both ends of the main scanning direction in the sub-scanning direction becomes greater, skew of light flux may become greater, and as closer to a peripheral portion, "diffusion of spot diameter" due to deterioration of wavefront aberration may become significant.

To correct a wavefront aberration, incidence height of light at a lens face having strong refractive power in the sub-scanning direction may need to be corrected to focus optical scanning beams at one point on a to-be-scanned face.

In an example embodiment, each of the exit planes 5A and 5B of scan lens 5 is formed as a face having strong refractive power in the sub-scanning direction, and the incidence plane 50 of scan lens 5 has negative refractive power in the sub-scanning direction at peripheral portions in a main scanning direction. The incidence plane 50 may be formed as a special face that curvature radius decreases from the center to peripheral portions in the main scanning direction, which means, at a special face, refractive power decreases from the center to peripheral portions in the main scanning direction.

By correcting incidence height and angle of incidence of light beams composing optical scanning beam with respect to the exit planes 5A and 5B having strong positive refractive power, which is set with a special shape of the incidence plane 50, the above described skew of light flux can be corrected, wavefront aberration deterioration can be suppressed, and each optical scanning beam can be preferably focused onto the surfaces S1 and S2.

As above described, skew of light flux may not occur for optical scanning beams going to the center in the main scanning direction, and thereby deterioration of wavefront aberration caused by oblique-entering may not occur. Accordingly, the center portion of the incidence plane 50 of scan lens 5 may not need to have curvature in the sub-scanning direction.

In such a case, refractive power of the incidence plane 50 in the sub-scanning direction may be set to zero (0) at the center portion of the incidence plane 50, and refractive power may increase in negative value as toward peripheral portions in the main scanning direction.

As for the scan lens 50, the exit planes 5A and 5B are respectively disposed for optical scanning beams going to the different surfaces S1 and S2, and the exit planes 5A and 5B have positive refractive power to focus the optical scanning beams onto the surfaces S1 and S2. Because only the exit plane of scan lens has a function to focus optical scanning beams onto a to-be-scanned face in the sub-scanning direction, the exit planes 5A and 5B of scan lens 5 may have strong positive refractive power. Especially, when the refractive power of the incidence plane 50 in the sub-scanning direction at the center portion in the main scanning direction is set to zero (0), the refractive power of the incidence plane 50 becomes negative refractive power at peripheral portions in the main scanning direction, by which positive refractive power of the exit planes 5A and 5B in the sub-scanning direction is set further stronger at peripheral portions in the main scanning direction.

As shown in FIG. 2, the exit planes 5A and 5B may be formed side by side in the sub-scanning direction.

Figure 3:
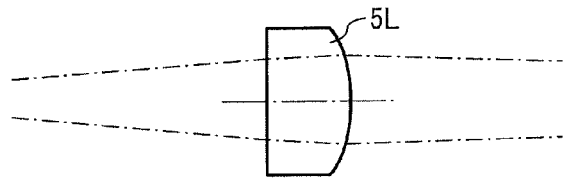
FIG. 3 shows a conventional scan lens having one face for incidence plane and one face for exit plane.

A light beam spot may be focused onto the surfaces S1 and S2 even if one face configuration is used for both of exit plane and incidence plane. FIG. 3 shows such a case using one face configuration for both of exit plane and incidence plane of a scan lens. The upper/lower direction in FIG. 3 corresponds to the sub-scanning direction, and a scan lens 5L is a single-lens, in which one face is set for both of exit plane and incidence plane of a scan lens.

Positive refractive power of exit plane of scan lens 5L in the sub-scanning direction is set greater to focus optical scanning beams onto a to-be-scanned face. As shown in FIG. 3, in an oblique system, optical scanning beams may pass through at a position outside of optic axis in the sub-scanning direction, and optical scanning beams passing through the scan lens 5L may refract in a direction that each optical scanning beams approaches closer with each other after passing through the scan lens 5L, by which an interval of optical scanning beams in the sub-scanning direction becomes narrow. Accordingly, it becomes difficult to dispose an optical-path refraction mirror, which can separate optical path for each optical scanning beam to different to-be-scanned portions.

Under such a situation, to secure a "beam-to-beam distance in the sub-scanning direction" at optical path separation position for optical scanning beam, an oblique-entering angle may need to be set greater, and a gap angle (or beam-to-beam angle) of optical scanning beams reflected at a same face of polygon mirror in the sub-scanning direction may need to be set greater. However, such configuration may deteriorate optical characteristic of the scan lens 5L greatly, by which correction may become hard to conduct.

Further, to conduct a correction process, negative refractive power of an incidence plane of scan lens 5L may need to set greater, and then positive refractive power of exit plane of scan lens 5L may need to set further stronger. Such adjustment may cause curvature radius of exit plane in the sub-scanning direction to become smaller, by which manufacturing processing of exit plane becomes hard, and deterioration of optical characteristic of the scan lens 5L caused by an error of eccentricity of the scan lens 5L may become greater, which is not a preferable condition.

Further, if incidence position of optical scanning beam to the scan lens 5L deviates in the sub-scanning direction due to a lens processing error or assembly error, image shape may change greatly in the main scanning direction at the incidence position, and curvature of image in the main scanning direction becomes greater, and thereby securing of stable optical characteristic may become difficult.

In the above described example embodiment, the exit side of the scan lens 5 may be formed with two exit planes 5A and 5B, formed in the sub-scanning direction side by side.

Figure 4:
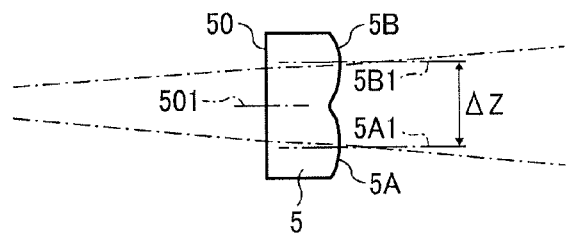
FIG. 4 shows a scan lens having one face for incidence plane and two faces for exit plane according to an example embodiment.

As shown in FIG. 4, by passing through optical scanning beams nearby optical reference axes 5A1 and 5B1 of the exit planes 5A and 5B, refraction of optical scanning beams in the sub-scanning direction by the exit plane can be mitigated, by which a narrowing of a beam-to-beam interval of optical scanning beams in the sub-scanning direction after passing through the scan lens 5 can be mitigated. Accordingly, while securing focusing function for optical scanning beams, an interval between optical scanning beams can be maintained at a preferable level.

Further, as shown in FIG. 4, because two optical scanning beams pass through positions that are relatively distant from an axis of the incidence plane 50 such as optical reference axis 501, direction of light going to the exit planes 5A and 5B can be changed preferably. Further, the same one face (i.e., incidence plane 50) can be used in common for a plurality of optical scanning beams.

The optical reference axes 501, 5A1, and 5B1 may exist in each lens face of the scan lens 5. Such optical reference axis is defined as an axis passing an origin of formula expressing each of optical faces 50, 5A, and 5B of the scan lens 5, and is perpendicular to a rotation axis of a face of a light deflector. As such, each of the optical reference axes 501, 5A1, and 5B1 is an axis passing an origin of formula expressing each of optical faces 50, 5A, and 5B.

Accordingly, the optical reference axes 501, 5A1, and 5B1 may be set in parallel each other in the sub-scanning direction.

A face having curvature in the sub-scanning direction that changes in the main scanning direction can be expressed by a following formula.

When a radius of paraxial curvature of a cross-sectional face in the main scanning direction parallel to the main scanning direction is "RY", a distance from an optical reference axis to the main scanning direction is "Y", a distance in the sub-scanning direction is "Z", high order coefficients are "A, B, C, D . . . ," and a radius of paraxial curvature of cross-sectional face in the sub-scanning direction, perpendicular to cross-sectional face in the main scanning direction, is "RZ", a face shape "X(Y,Z)" can be expressed as following "formula 1."

$$X(Y,Z)=Y^2 \cdot Cm/[1+\sqrt{[1-(1+K)\cdot(Y\cdot Cm)^2]}]+A\cdot Y^4+B\cdot Y^6+C\cdot Y^8+D\cdot Y^{10}+E\cdot Y^{12}\ldots+Cs(Y)\cdot Z^2/[1+\sqrt{[1-(Cs(Y)\cdot Z)^2]}]$$ (formula 1)

In formula 1, $Cm=1/RY$, $Cs(Y)=1/RZ+aY+bY^2+cY^3+dY^4+eY^5+fY^6+gY^7+hY^8+iY^9+jY^{10}\ldots$, and "a, b, c, d, . . . " are high order coefficients.

In the above-described optical scanning device, the scan lens 5 may be formed as single lens having one incidence plane 50 and two exit planes 5A and 5B, for example. The incidence plane 50 may not have a curvature at the center of main scanning direction in the sub-scanning direction. The incidence plane 50 may be formed as a concave face, in which curvature of concave face in the sub-scanning direction may become greater as toward peripheral portions in the main scanning direction.

The exit planes 5A and 5B may be formed side by side in the sub-scanning direction, which are corresponded to optical scanning beams going to different surfaces S1 and S2, by which deterioration of wavefront aberration caused by oblique-entering optical system can be corrected, and optical characteristic of a scan lens can be preferably set. Further, by separating the exit side of scan lens 5 into the exit planes 5A and 5B for each optical scanning beam, and passing through optical scanning beams nearby the optical reference axes 5A1 and 5B1, optical paths to guide a plurality of optical scanning beams to different surfaces S1 and S2 can be separated without setting greater oblique-entering angle, and deterioration of optical characteristic can be prevented.

Further, by using one single scan lens in common for a plurality of optical scanning beams, the number of scan lenses can be reduced, by which an optical scanning device of low cost can be devised compared to a conventional configuration to dispose a scan lens for each optical scanning beam going to a plurality of to-be-scanned objects.

If scan lenses are not used in common in oblique-entering optical and such scan lenses are arranged in a stacked manner in the sub-scanning direction, an interval of a plurality of optical scanning beams in the sub-scanning direction needs to be set greater, by which oblique-entering angle increases, and deterioration of wavefront aberration and occurrence of curving of scanning line may increase. In contrast, in the above described example embodiment, such drawbacks can be reduced, in particular minimized, by using one single scan lens in common for a plurality of optical scanning beams.

If one scan lens is not used in common for a plurality of optical scanning beams but a plurality of scan lenses are arranged in the sub-scanning direction, each scan lens may need a support rib at outside of effective area of lens face, by which a distance of adjacent optical scanning beams in the sub-scanning direction may become more distanced each other, by which oblique-entering angle may increase, and deterioration of optical performance may become greater.

If a greater interval for adjacent optical scanning beams is set without changing oblique-entering angle, each scan lens may need to be disposed far from a light deflector, and thickness of scan lens may become too thick to increase refractive power in the main scanning direction, by which scan lens becomes greater in size and manufacturing cost becomes higher. Further, assembly-related issues such as adhesion processing for fixing scan lenses stacked in the sub-scanning direction, higher precision positioning of scan lenses or the like, may become drawbacks.

A scan lens that is used in common for a plurality of light beams can be formed as one single lens by known method such as for example molding, but not limited such method, and a single lens configuration can reduce the number of parts of optical scanning device, and variation or fluctuation among parts can be reduced. If such single scan lens is used for multi-color image forming operation, variation of part tolerance can be reduced among parts used for optical scanning beams for each of colors, by which optical performance of each of colors can be maintained at a stable level.

Optical scanning beams going to different to-be-scanned faces may preferably enter a scan lens with a symmetrical angle in the sub-scanning direction with respect to a plane perpendicular to the rotation axis of the light deflector. In such a case, an angle of incidence of optical scanning beams in the sub-scanning direction with respect to a normal line of a face of the light deflector can be set to a minimum angle.

Further, a shape of exit plane of scan lens corresponding to each optical scanning beam may be set to the same shape, and may be set in a symmetrical shape in the sub-scanning direction with respect to an optical reference axis of incidence plane of scan lens. With such symmetrical shape, a scan lens can be formed easily, and shaping precision can be enhanced. Further, efficiency of design development process can be also enhanced because a design work may need to be conducted for just one exit plane.

Deterioration of optical characteristic caused by oblique-entering system can be corrected as above, and wavefront aberration can be corrected as above. It is preferable that correction of wavefront aberration amount is set smaller as much as possible, and from such viewpoint, the smaller the oblique-entering angle is better.

After passing through the scan lens 5, optical scanning beams going to different to-be-scanned faces can be guided to corresponding to-be-scanned face (e.g., actually, photoconductive face of photoconductor) using an optical-path inflection mirror, in which each optical scanning beam are separated for different optical paths. To secure an arrangement of optical path inflection mirror, an interval between optical scanning beams in the sub-scanning direction may need to be set to a given value, and such interval may change depending on oblique-entering angle.

To implement a compact in size of optical scanning device, a separation position of separating each optical scanning beam after passing through the scan lens 5 is preferably set just after passing through the scan lens 5. However, because a distance from such separation position to a light deflector is short, an oblique-entering angle may need to be set greater to secure a beam-to-beam interval required for separation. In other words, the more compact in size of optical scanning device, the greater the oblique-entering angle.

In the above described example embodiment, each of the exit planes 5A and 5B of scan lens 5 is corresponded to each optical scanning beam. Accordingly, to secure a given size required for forming each of the exit planes 5A and 5B, a given level of beam-to-beam interval between optical scanning beams in the sub-scanning direction at the exit face of scan lens 5 needs to be secured. Further, compact in size of optical scanning device, and compact in size of scan lens can be devised by arranging a scan lens at a position closer to a light deflector (i.e., polygon mirror 4), but in such a case, oblique-entering angle may also increase.

In the above described example embodiment, as shown in FIG. 2, reflection positions of optical scanning beams at a face of polygon mirror 4 are distanced each other in rotation axis direction (or in the sub-scanning direction) of polygon mirror 4, which means reflection positions of optical scanning beams at a face of polygon mirror 4 are distanced each other with respect to a plane perpendicular to the sub-scanning direction and including the optical reference axis of incidence plane 50 of scan lens 5.

Figure 5:
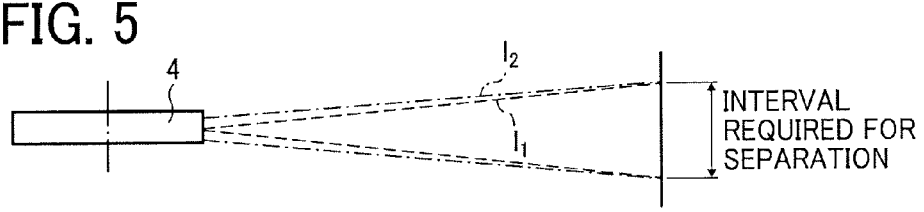
FIG. 5 shows a deviating condition of reflection position of optical scanning beams on a face of a polygon mirror in a sub-scanning direction.

As shown in FIG. 5, as for a face of polygon mirror 4 used as a light deflector, reflection positions of optical scanning beams may be crossed each other in a sub-scanning direction (see dotted line $l_1$), or reflection positions of optical scanning beams may be shifted each other in a sub-scanning direction (see dotted line $l_2$). A gap angle (or beam-to-beam angle) of optical scanning beams specified by oblique-entering angle can be set smaller when reflection positions are shifted in the sub-scanning direction to secure an interval for separating optical paths (i.e., interval required to arrange optical-path inflection mirrors for separating optical paths) as shown in FIG. 5.

Accordingly, as shown in FIG. 5, by shifting reflection positions of optical scanning beams at a face of polygon mirror in the sub-scanning direction, while securing a beam-to-beam interval in the sub-scanning direction for separating each optical paths extending to each corresponding to-be-scanned face, an oblique-entering angle can be reduced from a condition shown by line $l_1$ to a condition by shown by line $l_2$ shown in FIG. 5.

However, if reflection positions of optical scanning beams at a face of polygon mirror is shifted in the sub-scanning direction too great, such configuration may increase of a width of a face of polygon mirror 4 in the sub-scanning direction, by which a manufacturing cost of the polygon mirror 4 increases, and an increase of power consumption and noise generation of polygon mirror 4 needs to be considered. Shifting of reflection positions of optical scanning beams at a face of the polygon mirror 4 in the sub-scanning direction may be preferably set in manner so that a width of face of polygon mirror in the sub-scanning direction, set by shifting of reflection positions, becomes within a given range such as for example thickness of typical polygon mirror, which may be 3 mm or so.

In oblique system, an oblique-entering angle is typically set to three (3) to five (5) degrees or so, and in such system, an increase of one (1) degree of oblique-entering angle causes deterioration of optical characteristic such as deterioration of wavefront aberration significantly.

Accordingly, although a reduction level of oblique-entering angle by shifting reflection positions in the sub-scanning direction may be assumed small such as 0.5 to 1 degree or so, such reduction level of oblique-entering angle may have good level of effect for reducing deterioration of optical characteristic, by which stable optical characteristic can be secured.

Accordingly, a reflection position of each optical scanning beam at a face of the light deflector in the sub-scanning direction may be shifted for "shift amount η." For example, compared to an angle of incidence when shift amount η is set zero (η=0) (optical scanning beam shown by line $l_1$ in FIG. 5), an angle of incidence when reflection position is shifted for a given shift amount η (η≠0) can be set smaller for 0.5 to 1 degree. Accordingly, without increasing thickness of the polygon mirror 4, deterioration of wavefront aberration can be reduced effectively, and correction by a scan lens can be conducted easily, which will be explained in detail later.

In an example embodiment shown in FIG. 1, the optical elements 6A and 6B may be disposed between the scan lens 5 and surfaces S1 and S2, for example. Such optical element may be used to correct curving of scanning line in an oblique system. The optical elements 6A and 6B used in an example embodiment are translucent plates, in which at least one face of plate may be formed as tilt face, but both faces of one plate can be formed as tilt face.

Specifically, each of the optical elements 6A and 6B may be a parallel plate, which is a standard shape used for plate. For example, both faces of one parallel plate may not have curvature for both in the main scanning direction and sub-scanning direction. To such face, a tilt angle in the sub-scanning direction is variably set depending on positions in the main scanning direction, by which a tilt face can be set for the optical elements 6A and 6B.

By passing optical scanning beams through the optical elements 6A and 6B having such tilt face, optical scanning beams can be inflected in the sub-scanning direction with an effect of tilt angle. Such tilt angle, which can be variably set depending on positions in the main scanning direction, is set in a manner so that curving of scanning line of optical scanning beams can be corrected, by which curving of scanning line can be corrected.

Such tilt face may be disposed between the scan lens 5 and the surfaces S1 and S2 for following reasons. Specifically, as closer to a surfaces S1 and S2, light flux composed of optical scanning beams is more focused, and when light flux is more focused, a tilt face of optical element may effect optical scanning beams in light flux without significant adverse effect.

If a tilt face is positioned at a position that light flux composed of optical scanning beams is not yet enough focused, (i.e., a position that an area of beams composing light flux is large), an effect of tilt face to optical scanning beams may vary greatly depending on positions of light beams in the main scanning direction, and refracting angle of each light beam of light flux in the sub-scanning direction may change, by which skew of light flux may occur for optical scanning beams, and wavefront aberration may deteriorate.

In an example embodiment, between the scan lens 5 and the surfaces S1 and S2, optical scanning beam is focused in the main scanning direction due to positive refractive power of the scan lens 5 in the a main scanning direction, by which occurrence of skew of light flux can be effectively suppressed even if a tilt face is used, by which wavefront aberration may not deteriorate greatly, and curving of scanning line can be corrected.

As is evident from the above, it may be preferable to dispose a tilt face at a position, which is closer to a to-be-scanned face (e.g., S1, S2) as much as possible.

Further, because a beam diameter of optical scanning beam focused on each image height becomes smaller at a position closer to a to-be-scanned face, a tilt level of tilt face can be set with fine steps, by which curving of scanning line can be corrected preferably.

A shape of tilt face can be expressed by a following formula 2, for example.

When a radius of paraxial curvature of a cross-sectional face in the main scanning direction parallel to the main scanning direction is "RY", a distance from an optical reference axis to the main scanning direction is "Y", a distance in the sub-scanning direction is "Z", high order coefficients are "A, B, C, D . . . ," and a radius of paraxial curvature of cross-sectional face in the sub-scanning direction, perpendicular to cross-sectional face in the main scanning direction, is "RZ", a face shape "X(Y,Z)" can be expressed as following "formula 2". When a parallel plate is employed, both of RY and RZ become infinite (i.e., too great curvature radius that has no refractive power). Further, coefficient A becomes zero.

$$X(Y,Z)=Y^2 \cdot Cm/[1+\sqrt{[1-(1+K)\cdot(Y\cdot Cm)^2]}]+A\cdot Y^4+B\cdot Y^6+C\cdot Y^8+D\cdot Y^{10}+E\cdot Y^{12}\ldots+Cs(Y)\cdot Z^2/[1+\sqrt{[1-(Cs(Y)\cdot Z)^2]}]+(F0+F1\cdot Y+F2\cdot Y^2+F3\cdot Y^3+F4\cdot Y^4+\ldots)Z \quad \text{(formula 2)}$$

In formula 2, Cm=1/RY, and Cs(Y)=1/RZ.

A part of $(F0+F1\cdot Y+F2\cdot Y^2+F3\cdot Y^3+F4\cdot Y^4+\ldots)Z$ in formula 2 indicates a tilt level, and when F1, F2, . . . are not zero (0), a tilt level changes along the main scanning direction. Accordingly, the last term of right side of formula 2 is a primary expression for coordinate "Z" in the sub-scanning direction, and a part of "$(F0+F1\cdot Y+F2\cdot Y^2+F3\cdot Y^3+F4\cdot Y^4+\ldots)$" is a coefficient of primary expression, and such part has a relation with a tilt angle α such as tan α=$F0+F1\cdot Y+F2\cdot Y^2+F3\cdot Y^3+F4\cdot Y^4+\ldots$. Because coefficient changes depending on distance Y in the main scanning direction, tilt angle α changes along the main scanning direction. Such change of tilt angle α is set in manner so that curving of scanning line can be corrected.

The optical element 6 formed as parallel plate having the above described tilt face may have a uniform thickness, and for example, when resin is used as material, the optical element 6A can be formed easily and shaping precision of optical element 6 can be enhanced. The optical element 6 may be formed by a molding method, for example, but not limited thereto. In practice, the optical element 6 may have a specially designed tilt face, by which the optical element 6 may not have a uniform thickness in strictly, however, tilt level in the sub-scanning direction on a tilt face is small, by which it can be assumed that the optical element 6 can be formed with substantially uniform thickness as similar to a parallel plate.

Further, as above described, the optical element 6 may be preferably disposed at a position closer to a surface of a photoconductor, which is a to-be-scanned face. If the optical element 6 is disposed such position, the optical element 6 can be also used as a dustproof glass having a function to seal an optical scanning device so that toner and/or dust may not intrude in an optical scanning device. With such a configuration, an optical scanning device having preferable optical performance can be devised without increasing the number of parts.

Further, although the above described shape of incidence plane of scan lens, and shape of tilt face are expressed by formula 1 and formula 2, such expression of shape is not limited thereto, but a shape of such face can be expressed using another formula, as required.

In the above described example embodiment, two optical scanning beams optically scan two to-be-scanned portions (e.g., S1 and S2) simultaneously.

When an optical scanning device according to the above described example embodiment is employed for an image forming apparatus used for forming a full color image using four single colors such as yellow, magenta, cyan, and black, two optical scanning devices according to the above described example embodiment may be arranged in parallel to an arrangement direction of photoconductors to conduct optical scanning process to four to-be-scanned faces simultaneously. In such a configuration, a rotatable multi-faceted mirror used as light deflector having relatively high cost among parts used in an optical scanning device is used in common for four colors, in which two optical scanning beams obliquely enter a first face of this rotatable multi-faceted mirror, and another two optical scanning beams obliquely enter a second face of this rotatable multi-faceted mirror, disposed opposite position of first face. Accordingly, optical parts of optical scanning device may be positioned in a symmetrical manner around a rotation axis of rotatable multi-faceted mirror.

In such a case, oblique-entering angle, which is an angle set with respect to a face perpendicular to a rotation axis, may be set to the same angle for a plurality of optical scanning beams, in which the number of scan lenses can be reduced to two lenses compared to conventional apparatuses using four to eight lenses in general, by which preferable optical characteristic, compact in size, and low cost of optical scanning device can be achieved.

Figure 6:
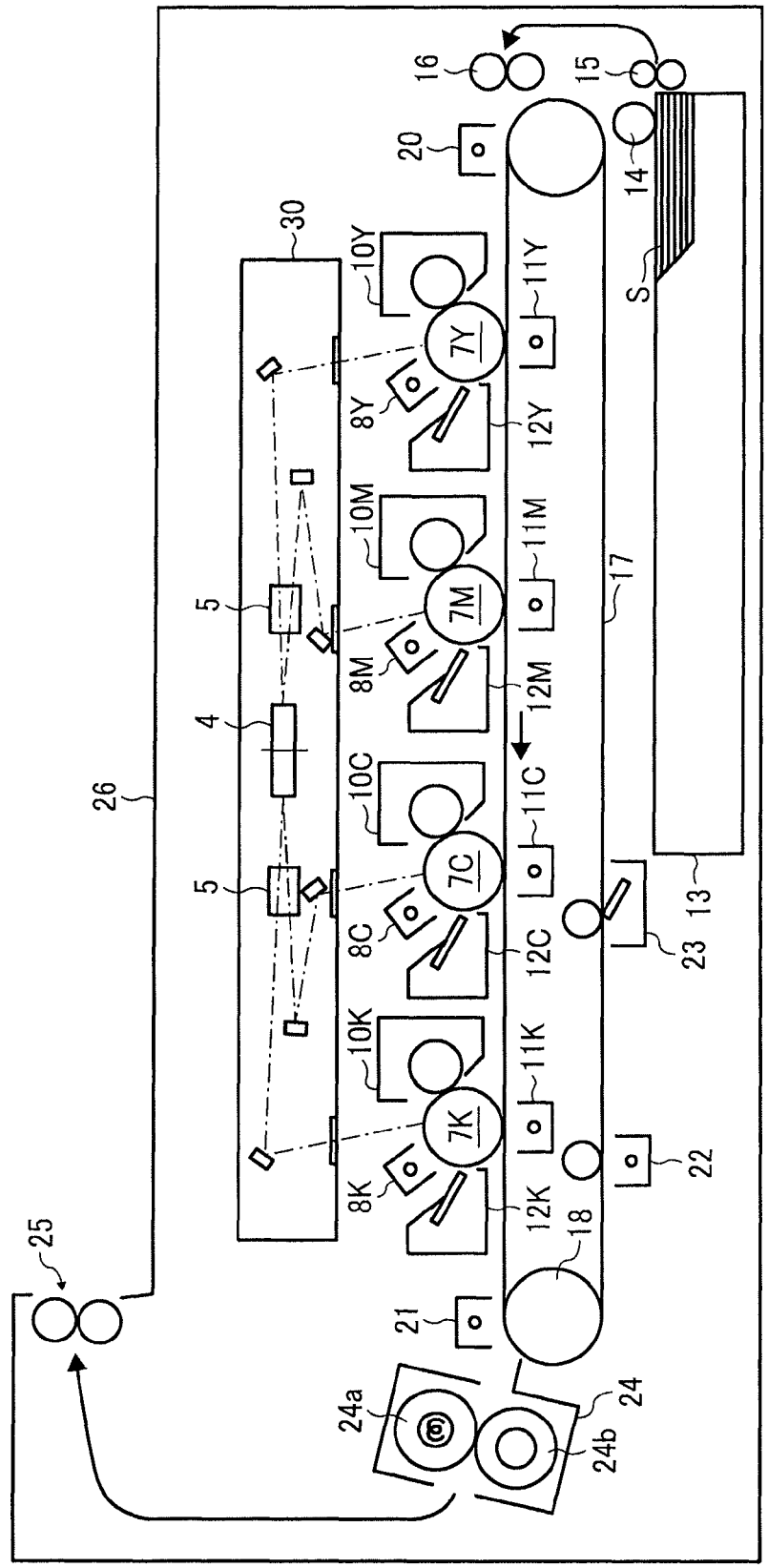
FIG. 6 shows an image forming apparatus according to an example embodiment.

FIG. 6 shows one example of an image forming apparatus according to an example embodiment. The image forming apparatus may be a tandem type full color laser printer, which includes the above described optical scanning device, in which a rotatable multi-faceted mirror (or light deflector) may be used in common for all colors.

As shown in FIG. 6, a sheet cassette 13 is disposed at a lower part of apparatus, and a transport belt 17 is disposed over the sheet cassette 13. Further, photoconductors 7Y, 7M, 7C, and 7K are disposed over the transport belt 17 side by side from right to left in FIG. 6, wherein the photoconductors 7Y, 7M, 7C, and 7K are made from photoconductivity material shaped in drum shape. The reference characters Y, M, C, and K indicate yellow, magenta, cyan, and black in this specification for photoconductors 7Y, 7M, 7C, and 7K and other units.

The photoconductor 7Y forms yellow image, and the photoconductors 7M, 7C, and 7K form magenta image, cyan image, and black image, respectively, wherein such single-color images may constitute color components of full color image to be produced.

Each of the photoconductors 7Y, 7M, 7C, and 7K may have a drum shape having the same drum diameter, and process devices or units used for conducting each process for electro-photography are disposed around the photoconductor 7 along a rotation direction of the photoconductor 7. For example, a charger 8Y, a development unit 10Y, a transfer charger 11Y, and a cleaning unit 12Y are disposed around the photoconductor 7Y in a clockwise direction. Other photoconductors 7M, 7C, and 7K have such same configuration. Further, an optical scanning device 30 may be disposed over the photoconductors 7Y to 7K. The optical scanning device 30 includes the polygon mirror 4 used as a light deflector, in which parts such as optical parts shown in FIGS. 1 and 2 are disposed with two sets in a symmetrical manner with respect to a rotation axis of the polygon mirror 4 having deflective reflection faces, in which the polygon mirror 4 is used in common for such arranged two sets of optical parts.

The optical scanning device 30 conducts an optical scanning process for each of the photoconductors 7Y to 7K by irradiating optical scanning beams, generated based on signals prepared from image data having yellow to black images, through a space between the charger 8 and the development unit 10.

The polygon mirror 4 can be used as one light deflector used in common for four optical scanning beams. In a right side of FIG. 6, two optical scanning beams of oblique system optically scan the photoconductors 7Y and 7M, and in a left side of FIG. 6, two optical scanning beams of oblique system optically scan the photoconductors 7C and 7K. The optical scanning device 30 may use two scan lenses. One scan lens is used as a common scan lens for optical scanning beams optically scanning the photoconductors 7Y and 7M, and other scan lens is used as a common scan lens for optical scanning beams optically scanning the photoconductors 7C and 7K.

Further, registration rollers 16 and a belt charger 20 may be disposed for the transport belt 17 at a position upstream of the photoconductor 7Y while a belt separation charger 21, a belt decharger 22, and a belt cleaning unit 23, may be disposed for the transport belt 17 at a position downstream of the transport belt 17 (or photoconductor 7K), wherein such units are disposed along a rotation direction of transport belt 17. Further, a fixing device 24 may be disposed at a position downstream of the belt separation charger 21 (or downstream of transportation direction of transfer sheet), and a transfer sheet having an image fixed by the fixing device 24 is ejected by an ejection roller 25 to an ejection tray 26.

In case of full color mode (or multiple color mode), each of the photoconductors 7Y, 7M, 7C, and 7K is charged by a charger, and then optically scanned by the optical scanning device 30 to form an electrostatic latent image corresponding to each color. Such electrostatic latent image can be developed as a toner image using each color toner by each development unit 10. A transfer sheet S can be fed from the sheet cassette 13 by a sheet feed roller 14, and a transport roller 15, and the registration rollers 16 feeds the transfer sheet S onto the transport belt 17 at a transfer timing.

The outer face of transport belt 17 can be charged by the belt charger 20, and the transfer sheet S fed on the transport belt 17 from the registration rollers 16 can be electro-statistically adsorbed on the transport belt 17 and transported by the transport belt 17 so that each color toner image is transferred from the photoconductors 7Y to 7K onto the transfer sheet S. Such transferred toner images are superimposed on the transfer sheet S to form a full color image. After fixing the full color image on the transfer sheet S at the fixing device 24, the transfer sheet S is ejected by the ejection roller 25 to the ejection tray 26.

A description is now given to example shape and position of the scan lens 5 according to an example embodiment shown in FIG. 1. It should be noted the following example is just one example, and other examples can be devised as required.

The light sources 1A and 1B employing semiconductor lasers have an emission wavelength of 659 nm, for example. The coupling lenses 2A and 2B for coupling optical scanning beams radiated from the light sources 1A and 1B have a focal distance of 27 mm, for example. Each optical scanning beam can be converted to substantially-parallel light flux by the coupling lenses 2A and 2B, and the optical scanning beam is focused as a line image extending in the main scanning direction nearby a face of polygon mirror 4 by the cylindrical lenses 3A and 3B having refractive power only in the sub-scanning direction.

The cylindrical lenses 3A and 3B have a focal distance of 46.67 mm (for light wavelength of 659 nm) in the sub-scanning direction, for example.

The polygon mirror 4 has a radius of inscribed circle of 7 mm, and the number of faces is four (4), for example.

Further, the coupling lenses 2A and 2B is made of glass having a refractive index of 1.6894 for the light source having wavelength of 659 nm. Further, each of the cylindrical lenses 3A and 3B is made of resin having a refractive index of 1.5271 for the light source having wavelength of 659 nm, and is formed with a diffraction face for correcting fluctuation of focus position of line image, which may be caused by temperature change.

Such consideration is given in view of high magnification in the sub-scanning direction of scan lens 5, by which effect of fluctuation of focus position of line image, due to temperature change, to optical scanning process can be reduced.

Optical scanning beam entering the polygon mirror 4 from the light source side has an oblique-entering angle of three (3) degrees at a face of the polygon mirror 4, for example. On a face of the polygon mirror 4, a reflection point of each optical scanning beam is distanced with each other for about 1 mm (millimeter) in the sub-scanning direction. Accordingly, each reflection position of reflection point is shifted from an optical reference axis of incidence plane of scan lens 5 for about 0.5 mm in the sub-scanning direction. The optical scanning beams reflected at a face of the polygon mirror 4 form a gap angle (or beam-to-beam angle) of 6 degrees in the sub-scanning direction, and goes to the incidence plane of the scan lens 5.

As such, two optical scanning beams for two to-be-scanned faces enter one face of the polygon mirror 4 with an oblique-entering angle of ±3 degrees. As shown in FIG. 1A, when viewed from the sub-scanning direction, each optical scanning beam enters the incidence plane of the scan lens 5 with a main angle of incidence of about 68 degrees with respect to the optical reference axis of the scan lens 5, for example.

In an area from the polygon mirror 4 to the surfaces S1 and S2, a distance from the rotation center of the polygon mirror 4 to the incidence plane of the scan lens 5 is set to 32 mm, for example. A distance from the rotation center of the polygon mirror 4 to the optical reference axis of the scan lens 5 is set to 2.9 mm in the main scanning direction, for example.

The scan lens 5 is made of a material having a refractive index of 1.5271 for the light source having wavelength of 659 nm, and has a thickness of 13.8 mm at its center portion, and a distance from the exit plane of the scan lens 5 to the surfaces S1 and S2 is set to 154.2 mm, for example. The optical elements 6A and 6B are disposed at a 90-mm distance from the surfaces S1 and S2 toward the scan lens 5.

Each of the optical elements 6A and 6B has a thickness of 1.9 mm, for example. Each optical element is made as a parallel plate having a refractive index of 1.51425 for the light source having wavelength of 659 nm, and a tilt face shape is applied to both faces of parallel plate, and each optical element also function as a dust-proof member for a housing of optical scanning device.

Table 1 shows parameters of incidence plane 50 and exit plane 5A/5B of the scan lens 5 (exit plane has two planes having same shape) expressed by the above-described formula 1.

TABLE 1

| | Scan lens | |
|---|---|---|
| | Incidence plane | Exit plane |
| RY | 153.991 | −173.598 |
| K | 0 | 0 |
| A | −9.4407E−06 | −4.80E−06 |
| B | 1.1349E−08 | 2.68E−09 |
| C | −1.9216E−11 | −4.55E−12 |
| D | 1.8360E−14 | 3.58E−15 |
| E | −1.1870E−17 | −2.45E−18 |

TABLE 1-continued

| | Scan lens | |
|---|---|---|
| | Incidence plane | Exit plane |
| F | 3.9502E−21 | 4.67E−22 |
| RZ | ∞ | −14.922 |
| a | 1.0509E−05 | −4.00E−05 |
| b | −4.2663E−05 | 1.14E−05 |
| c | −2.3107E−07 | −2.48E−08 |
| d | 7.4767E−08 | −4.28E−08 |
| e | 5.4123E−10 | 4.12E−12 |
| f | −7.3607E−11 | 4.56E−11 |
| g | −3.6942E−13 | 1.72E−14 |
| h | 2.9274E−14 | −3.82E−14 |

The optical reference axis of each exit plane 5A/5B of scan lens 5 is shifted for ±2.5 mm in the sub-scanning direction from the optical reference axis of incidence plane of scan lens 5, by which an interval of optical reference axis of each exit plane 5A/5B in the sub-scanning direction is set to 5 mm (see ΔZ in FIG. 4), for example. The exit planes 5A/5B are formed with a lens face shape using parameters shown in Table 1 side-by-side in the sub-scanning direction.

Table 2 shows parameters of shape of tilt face formed on both faces of the optical element 6A expressed by formula 2.

TABLE 2

| | Optical element | |
|---|---|---|
| | Incidence plane | Exit plane |
| RY | ∞ | ∞ |
| RZ | ∞ | ∞ |
| F1 | −6.5475E−05 | — |
| F2 | −1.0024E−05 | — |
| F3 | 5.0014E−10 | — |

The shape of the optical element 6B can be expressed by inverting the shape indicated in Table 2 in the sub-scanning direction.

As shown in FIG. 1B, the optical element 6A is disposed by tilting for 14 degrees in the sub-scanning direction in view of the optical reference axis of incidence plane of scan lens 5, and such the optical element 6A receives an incidence light. By using this tilt face, curving of scanning line (peak-to-valley value of scanning position in the sub-scanning direction at a to-be-scanned face) can be corrected to a smaller value such as 20 μm or less, for example. Arrangement positions and face shape of optical elements to pass through optical scanning beams from the scan lens 5 are symmetrically disposed with respect to a virtual plane, perpendicular to a rotation axis of the light deflector and including an optical reference axis of incidence plane of scan lens 5.

In this example case, between the coupling lenses 2A and 2B and the cylindrical lenses 3A and 3B, an aperture member having a rectangular opening is disposed for beam shaping, wherein the rectangular opening has a length of 2.3 mm in the main scanning direction and a length of 2.7 mm in the sub-scanning direction, for example. With such beam shaping process, a preferable light beam spot having a length of about 65 μm in the main scanning direction and a length of about 70 μm in the sub-scanning direction can be obtained, for example, on each of the surfaces S1 and S2.

An optical scanning device according to an example embodiment may have following configuration. Specifically, a plurality of optical scanning beams used for optically scanning a plurality of to-be-scanned portions simultaneously enter the same face of a light deflector at different angle of incidence in the sub-scanning direction each other, which means the optical scanning device according to an example embodiment is employed for an oblique system.

A scan lens according to an example embodiment is formed as a single lens upon which a plurality of scan beams deflected by the same face of a light deflector is incident. Specifically, a plurality of optical scanning beams entering the same face of the light deflector with oblique angle and deflected at the same face enter the single scan lens. Such scan lens formed as single lens means that only this single scan lens has focusing function using refraction in each optical path of each of optical scan beams, extending from a scan lens to a plurality of to-be-scanned portions.

Further, one or more reflection mirrors may be employed to set each optical path from the scan lens to a plurality of to-be-scanned portions.

Such scan lens has following features, for example. Specifically, a face of scan lens facing a face side of the light deflector is one incidence plane, and a face of scan lens facing to-be-scanned portion side includes a plurality of exit planes separately disposed in the sub-scanning direction while corresponded to each to-be-scanned portion.

A plurality of optical scanning beams deflected by the light deflector enter a single incidence plane of scan lens, and when exiting from the scan lens, such optical scanning beams separately exit from each of exit planes set in the sub-scanning direction, which are corresponded to each of to-be-scanned portions.

The number of optical scanning beams is set to "n," and the number of to-be-scanned portions is also set to "n," wherein "n" is natural number of two or greater. As for the scan lens, "n" exit planes are separately disposed in the sub-scanning direction.

When optical scanning beams is deflected by a light deflector, each of optical scanning beams may be numbered as the first to n-th optical scanning beams in the sub-scanning direction. For example, as for the "i-th" optical scanning beam, such i-th optical scanning beam enters a common incidence plane of scan lens, and exit from the "i-th" exit plane set in the scan lens in the sub-scanning direction, and optically scans the "i-th" to-be-scanned portion.

The number of "n" may be two as a minimum value, and may be four to six or so as a maximum value.

Accordingly, the i-th optical scanning beam deflected by a light deflector can be focused on the i-th to-be-scanned portion with an effect of incidence plane and the i-th exit plane of scan lens.

The incidence plane of scan lens is formed as a special face, in which refractive power in the sub-scanning direction decreases as toward peripheral portions in the main scanning direction. Each of "n" exit planes formed at exit side of scan lens is formed as a face having positive refractive power in both of the main scanning direction and in the sub-scanning direction.

As for the incidence plane, a decrease of refractive power in the sub-scanning direction as toward peripheral portions in the main scanning direction means that refractive power of incidence plane in the sub-scanning direction changes in "negative direction" as positions in the main scanning direction change from the center portion of the main scanning direction to peripheral portions in the main scanning direction.

For example, if the center portion of the main scanning direction has positive refractive power in the sub-scanning direction, positive value of such positive refractive power in the sub-scanning direction decreases as positions shifts to peripheral portions in the main scanning direction, by which positive refractive power in the sub-scanning direction at peripheral portions in the main scanning direction becomes a weak positive refractive power, or refractive power in the sub-scanning direction at peripheral portions in the main scanning direction becomes negative value, and further refractive power in the sub-scanning direction at peripheral portions in the main scanning direction becomes negative refractive power having further greater negative value.

Each of exit planes of scan lens having positive refractive power for both in the main scanning direction and the sub-scanning direction is formed as convex shape, and each of exit planes may be preferably formed as anamorphic face having different positive refractive power between in the main scanning direction and the sub-scanning direction.

In the optical scanning device according to an example embodiment, as for an incidence plane of scan lens, the center portion of incidence plane in the main scanning direction may be set with no curvature in the sub-scanning direction. In such a case, refractive power of incidence plane in the sub-scanning direction is set zero (0) at the center portion in the main scanning direction, and negative refractive power increases gradually as toward peripheral portions in the main scanning direction.

In the optical scanning device according to an example embodiment, an optical element having at least one tilt face may be preferably arranged between a scan lens and each to-be-scanned face. Such tilt face of optical element does not have curvature for both in the main scanning direction and sub-scanning direction but has a tilt angle in the sub-scanning direction depending on positions in the main scanning direction. Such optical element may have a tilt face on one of face of optical element, or on both faces of optical element. Such tilt face may be set as a face that passes through optical scanning beams, or to a face that reflects optical scanning beams. A shape of tilt face is formed in a shape that can correct curving of scanning line caused by an oblique system.

In the optical scanning device according to an example embodiment, the number of to-be-scanned portions, optically scanned by optical scanning beams deflected at the same face of a light deflector, may be two, and a scan lens may have two exit planes separated in the sub-scanning direction. Each of two exit planes may have the same shape, and formed as a special face that curvature radius in the sub-scanning direction of lens face changes as toward peripheral portions in the main scanning direction.

In the optical scanning device according to an example embodiment, optical scanning beams going to two different to-be-scanned portions enter the same face of the light deflector preferably with a symmetrical angle of incidence, which is not zero ($\neq 0$), in the sub-scanning direction when optical scanning beams are simultaneously deflected.

In the optical scanning device according to an example embodiment, a reflection position of each optical scanning beam at a face of the light deflector may be shifted for a shift amount $\eta$ in the sub-scanning direction. When a reflection position of each optical scanning beam is shifted for a shift amount $\eta$ having a given value not zero, an angle of incidence of each optical scanning beam can be set smaller for 0.5 to 1 degree compared to an angle of incidence of optical scanning beam when $\eta=0$.

In the optical scanning device according to an example embodiment, a light deflector may be a rotatable multi-faceted mirror, and two optical scanning devices according to an example embodiment may be used, in which two optical scanning devices are symmetrically disposed about one common rotatable multi-faceted mirror so that optical scanning can be conducted for four to-be-scanned portions simultaneously. An image forming apparatus according to an example embodiment may be an image forming apparatus using electrophotography for image forming operation, and the optical scanning device according to an example embodiment may be used as an optical scanning device to conduct an exposure process in electrophotography.

In the optical scanning device according to an example embodiment, each exit plane of scan lens is set with a function of focusing optical scanning beam onto a to-be-scanned portion. Accordingly, the exit plane may have strong positive refractive power, by which wavefront aberration may more likely to occur.

In view of such wavefront aberration, an incidence plane of scan lens is formed as a special face that refractive power of incidence plane becomes weak as toward peripheral portions in the main scanning direction, and with an effect of shape of such special face, an incidence height and angle of incidence of light used as optical scanning beam with respect to each exit side plane having strong positive refractive power can be corrected, by which deterioration of wavefront aberration (such as skew of light flux) can be corrected, and optical scanning beams can be focused at one point on a to-be-scanned portion.

As above described, the optical scanning device according to an example embodiment may be used for an oblique system, in which the optical scanning device can preferably suppress an occurrence of wavefront aberration and can conduct preferable optical scanning process while optically scanning a plurality of to-be-scanned portions simultaneously. Further, by employing an optical element having at least one tilt face, curving of scanning line caused by oblique system can be preferably reduced.

In the above described example embodiment, a lens used for scan/focus optical system is a single lens, by which optical scanning device used for oblique system can be further simplified, and an increase of wavefront aberration can be effectively suppressed, and thereby preferable optically scanning can be conducted, and further, curving of scanning line can be effectively corrected.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An optical scanning device, comprising:
a plurality of light sources that emit light used as a plurality of optical scanning beams;
an optical system disposed between the light sources and a light deflector, for receiving the optical scanning beams and configured such that the plurality of optical scanning beams strike a same face of the light deflector at different angles of incidence;
the light deflector configured to deflect the plurality of optical scanning beams by the same face to optically scan a plurality of to-be-scanned portions simultaneously; and
a single scan lens that receives the plurality of optical scanning beams from the light deflector, and focuses the plurality of optical scanning beams on the plurality of to-be-scanned portions to optically scan the plurality of to-be-scanned portions,
wherein the single scan lens is used in common for the plurality of optical scan beams deflected by the same face of the light deflector, the single scan lens having at least one incidence plane at the face side of the light deflector and a plurality of exit planes at the to-be-scanned portions side, wherein a total number of incidence planes is different than a total number of exit planes, each exit plane is separately formed in a sub-scanning direction for each of the to-be-scanned portions, and the exit planes of the single scan lens are formed as a face having positive refractive power both in the main scanning direction and sub-scanning direction.

2. The optical scanning device of claim 1, wherein a center portion of the incidence plane of the single scan lens in the main scanning direction does not have curvature in the sub-scanning direction.

3. The optical scanning device of claim 1, further comprising an optical element disposed between the single scan lens and each of the to-be-scanned portions,
wherein the optical element has at least one face having no curvature in either the main scanning direction or the sub-scanning direction and the at least one face is a tilt face having a tilt angle to the sub-scanning direction that varies with positions in the main scanning direction.

4. The optical scanning device of claim 1, comprising two to-be-scanned portions optically scanned by optical scanning beams deflected by the same face of the light deflector,
wherein the single scan lens comprises two separate exit planes of the same shape in the sub-scanning direction, with each of the two exit planes formed as a special face of which a curvature radius in the sub-scanning direction changes toward peripheral portions in the main scanning direction.

5. The optical scanning device of claim 4, wherein optical scanning beams directed onto the two to-be-scanned portions strike the same face of the light deflector and are deflected simultaneously at an angle of incidence symmetrical in the sub-scanning direction, wherein the angle of incidence is not zero.

6. The optical scanning device of claim 5, wherein a reflection position of each optical scanning beam on a face of the light deflector is shifted by a shift amount rb which is not zero, in the sub-scanning direction,
wherein the shift amount not zero, is a value such that the angle of incidence of each optical scanning beam becomes smaller by 0.5 to 1 degree than the angle of incidence of the optical scanning beam when rb is zero.

7. An optical scanning assembly, comprising:
the optical scanning device of claim 4 used as a first optical scanning device; and
a second optical scanning device including a plurality of light sources that emit light used as optical scanning beams and a single scan lens without a rotatable multi-faced mirror,
wherein optical components of the first and second optical scanning devices are disposed symmetrically with respect to the rotatable multi-faced mirror disposed for the first optical scanning device, and optical scanning is simultaneously conducted for four to-be-scanned portions.

8. An image forming apparatus using electrophotography, comprising the optical scanning device of claim 1, and a plurality of photoconductors as the to-be-scanned portions.

9. The optical scanning device of claim 1, wherein at the incidence plane of the single scan lens, the reflection power at each edge portion of the incidence plane is set smaller than the reflection power at the center portion of the incidence plane in the main scanning direction.

10. The optical scanning device of claim 1, wherein the incidence plane of the single scan lens is formed as a face in which a refractive power of the lens in a sub-scanning direction decreases toward peripheral portions in a main scanning direction.

11. The optical scanning device of claim 10, wherein the refractive power in the sub-scanning direction is negative at the peripheral portions in the main scanning direction.

12. The optical scanning device of claim 1, wherein the total number of incidence planes at the face side of the light deflector equals one, and the total number of exit planes at the to-be-scanned portions side equals two.

13. The optical scanning device of claim 1, wherein the plurality of optical scanning beams strike the same face of the light deflector obliquely in the sub-scanning direction.

14. The optical scanning device of claim 1, wherein the incidence plane has one optical face at the face side of light deflector and the plurality of exit planes each has an optical face at the to-be-scanned portions side.

15. The optical scanning device of claim 14, wherein a size of the optical face of the incidence plane is greater than a size of any optical face of any exit plane.

16. The optical scanning device of claim 14, wherein an effective area of the optical face of the incidence plane is greater than an effective area of any optical face of any exit plane.

* * * * *